Sept. 11, 1934.    J. H. WESTFIELD    1,973,190
FREEZING MECHANISM
Filed June 26, 1931    2 Sheets-Sheet 1
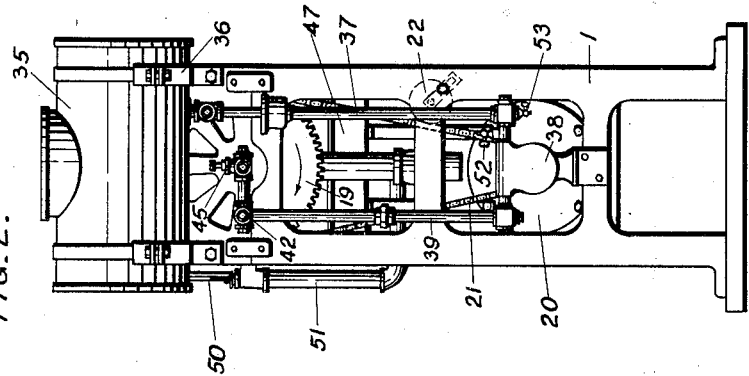
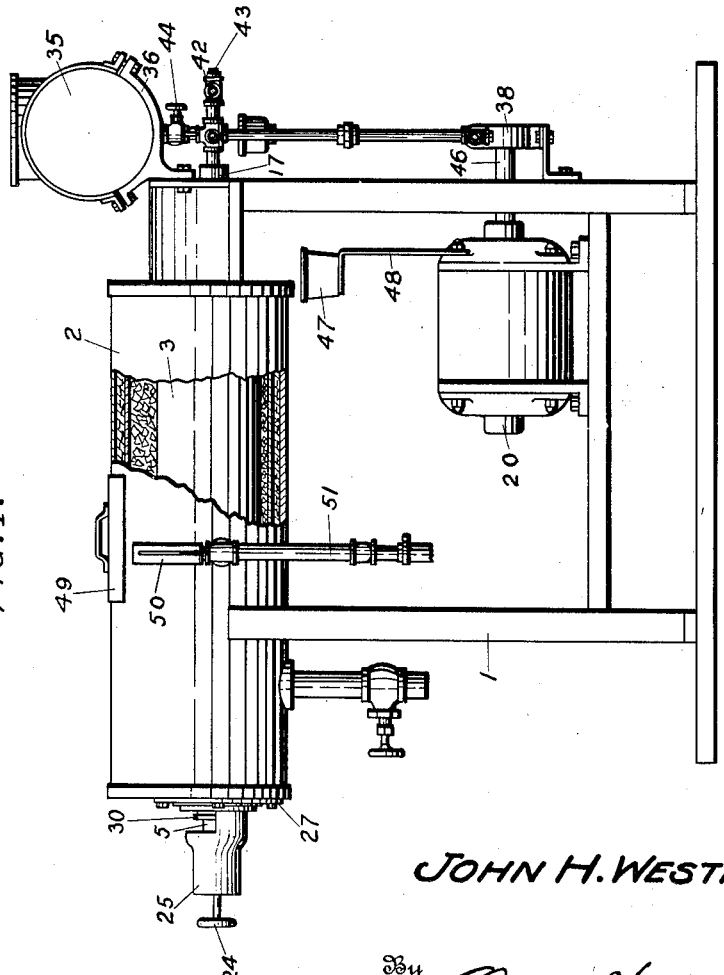
Inventor
JOHN H. WESTFIELD
By Owen H. Spencer
Attorney Sept. 11, 1934.  J. H. WESTFIELD  1,973,190
FREEZING MECHANISM
Filed June 26, 1931  2 Sheets-Sheet 2
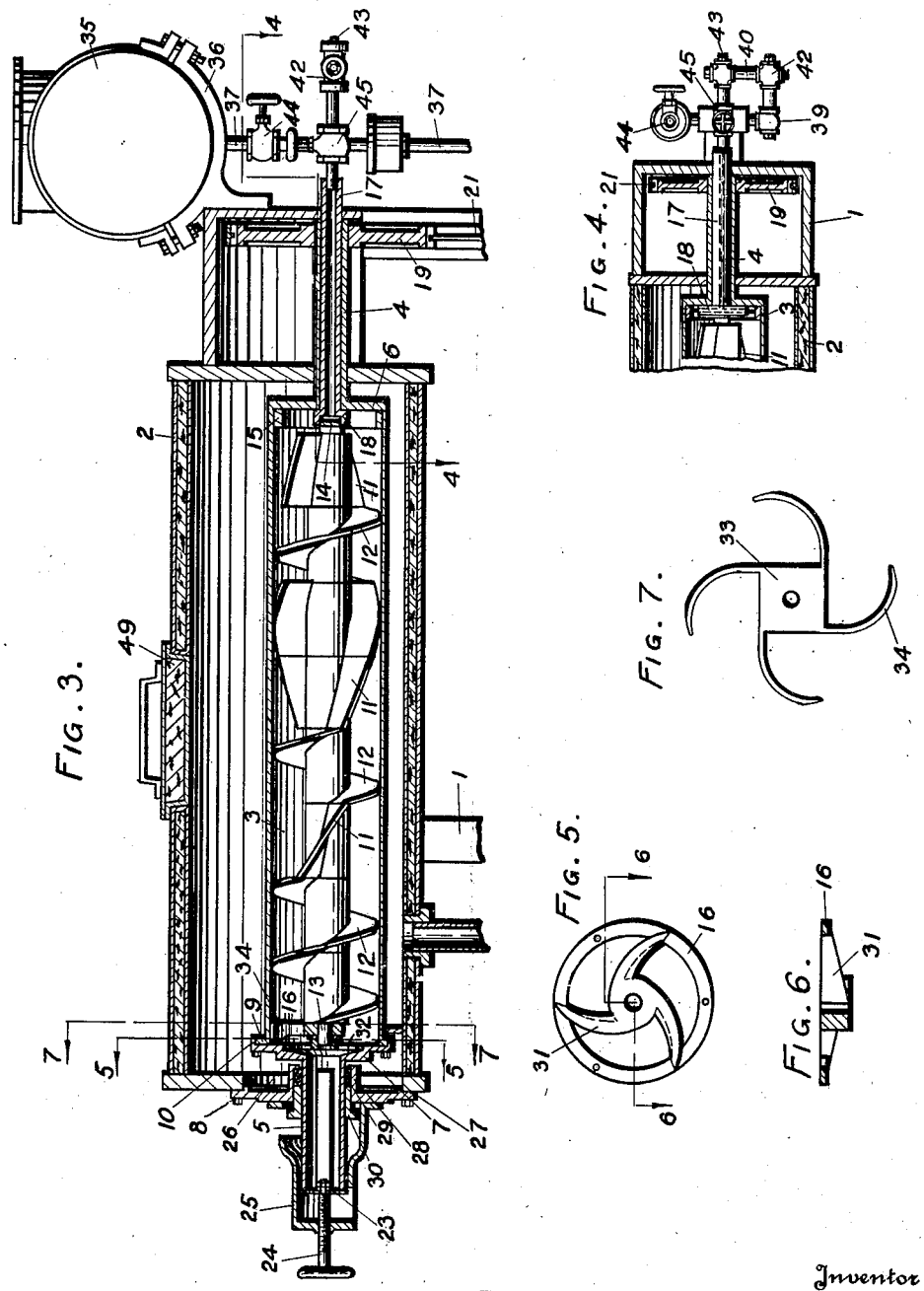
Inventor
JOHN H. WESTFIELD
By Owen H. Spencer
Attorney Patented Sept. 11, 1934

1,973,190

UNITED STATES PATENT OFFICE

1,973,190

FREEZING MECHANISM

John H. Westfield, Indianapolis, Ind.

Application June 26, 1931, Serial No. 547,130

4 Claims. (Cl. 259—10)

This invention relates to freezing mechanisms adapted primarily for freezing ice cream and its allied products and is an improvement over my former invention filed May 14, 1929, Serial No. 363,046 and one feature of the present invention is the provision of a pump mechanism for feeding the ingredient to be frozen to the freezing compartment.

A further feature of the invention is in so attaching the pump mechanism to the driving motor that the drive on the pump will be direct from the motor.

A further feature of the invention is the provision of means for sterilizing the pump mechanism and pipes attached thereto without directing the sterilizing medium through the freezing compartment.

A further feature of the invention is the provision of means for positively feeding the freezing material through the freezing compartment and cause the same to discharge in measured quantities at the discharge end of the freezing compartment.

A further feature of the invention is the provision of means for taking up slack in the driving chain employed for driving the freezing chamber from the motor.

A further feature of the invention is the provision of a drip pan for catching any drippings from the feed end of the machine and prevent the same coming in contact with the motor.

Other objects and advantages will be hereinafter more fully set forth and pointed out in the accompanying specification.

In the accompanying drawings which are made a part of this application,

Figure 1 is a side elevation of the machine with parts broken out.

Figure 2 is an end elevation thereof.

Figure 3 is a longitudinal central sectional view through the freezing compartment of the device.

Figure 4 is a detail sectional view as seen along line 4—4, Fig. 3.

Figure 5 is a detail elevation of a force feed mechanism as viewed from line 5—5, Fig. 3.

Figure 6 is a sectional view thereof as seen from line 6—6, Fig. 5, and,

Figure 7 is a detail elevation of a scraper mechanism as seen from line 7—7, Fig. 3.

Referring to the drawings in which similar reference numerals designate corresponding parts throughout the several views, the numeral 1 designates a supporting frame to the upper end of which is mounted a barrel 2, for the reception of a freezing medium, preferably ice and 3 indicates a drum adapted to receive the preparation to be frozen, said drum 3 extending longitudinally of said barrel 2 and eccentrically thereto.

The drum 3 is rotatably suspended within the barrel 2 through the medium of tubular shafts 4 and 5, the shaft 4 being preferably formed integral with the end wall 6 of the drum 3 while the shaft 5 is preferably formed integral with the removable head 7 at the opposite end of the drum 3, the head 7 being removably attached to the drum 3 in any suitable manner, as by means of machine screws 8. In order to form a perfect seal between the head 7 and the end of the drum 3, to prevent brine entering the drum, the end of the drum 3 is provided with a radial flange 9, while the head 7 is provided with a horizontally extending flange 10 adapted to extend over and tightly fit the peripheral edge of the radial flange 9, with the inner face of the head resting against the end of the drum and one face of the flange 9.

In order to thoroughly agitate the product being frozen and at the same time cause the same to travel through the drum 3 and discharge through the hollow shaft 5, a plurality of interspersed spirally arranged flanges 11 and screw blades 12 are fixed to a shaft 13, said shaft extending lengthwise through the drum 3 and concentrically therewith so that the edges of the members 11 and 12 will rest in juxtaposition to the wall of the drum 3.

The end of the shaft 13, adjacent the end wall 6, is connected to a cross bar 14, carried by a centering ring supporting member 15, which member 15 fits within the drum 3, while the opposite end of the shaft is mounted in the hub portion of a bearing plate 16, the bearing plate being in turn attached to the head 7 in any suitable manner.

The shaft 13 and parts carried thereby, are held against rotation by extending a hollow sleeve 17 through the tubular shaft 4, the outer end of the sleeve being fixed to parts of the frame 1, while the inner end thereof is provided with a yoke 18, through which extends the cross bar 14, thus holding the cross bar 14 and shaft 13 against rotation.

The drum 3 is driven by placing a gear 19 on the shaft 4, which is connected to a motor 20 through the medium of a driving chain 21 and in order to take up any slack in the chain 21 without effecting the parts driven by the motor 20, a takeup idler 22 is adjustably mounted on parts of the frame 1 so that it may be moved toward the chain for removing any slack therefrom.

The material being frozen will be fed through the drum 3 by means of the members 11 and 12 when the drum is rotated, said members thoroughly agitating the milk product and gradually feeding it towards the head 7, where it is discharged through the tubular shaft 5. The discharge of the frozen product is controlled by means of a gate 23, which is carried by an adjusting screw 24, threaded through the end wall of a hood 25, so that the gate may be adjusted with respect to the discharge end of the shaft 5, or may be entirely closed against the end of the shaft 5 to prevent discharge of the material within the drum 3, as when the freezing operation is first started, thus preventing discharge of the material until it is properly frozen.

The drum 3 is entered into the barrel 2, through an opening 26 and this opening is closed by a cover plate 27, said cover plate having a central bearing 28, through which the shaft 5 extends. The bearing 28 is arranged to receive suitable packing 29, which is forced into the recess of the bearing and around the shaft 5, by means of a packing nut 30, which threads into the bearing.

As the product being frozen is somewhat solidified as it reaches the discharge end of the drum 3, the bearing plate 16 is provided with auger-like spokes 31, which tend to gather the frozen material and force the same toward the opening in the shaft 5, and to permit the frozen material to more readily enter the opening in the tube 5, the inner face of the head 7 is cut out to form a tapering cavity 32, which tends to guide the frozen material toward the opening in the shaft 5 as well as provide space for the frozen material as it discharges from the auger-like spokes 31.

In order to prevent the frozen material packing at the discharge end of the drum 3, a scraper structure is mounted on the shaft 13 in juxtaposition to the inner face of the head 7, said scraper comprising a hub member 33 and a plurality of flat scraper arms 34, the free ends of said arms being curved so that they will force the frozen material toward the axis of the drum 3 and in position to be taken up by the auger-like spokes 31 and forced into and through the shaft 5.

The milk product is supplied to the drum 3 from a supply tank 35, said tank being preferably mounted on brackets 36 at the upper end of the frame 1, the product being conveyed from the tank through a pipe 37, to one side of a force pump 38, thence through a pipe 39 to the outer end of the sleeve 17 and thence into the drum 3, the pipe 39 having an L-shaped section 40, connected to the sections of the pipe 39, by four-way T-couplings 42, certain of the coupling openings being provided with threaded plugs 43, so that they may be removed and extensions, (not shown) attached in their place to provide suitable drainage, when desired. The pipe 37 and the pipe 39, are provided with valves 44 and 45 respectively, so that the flow of the milk product may be shut off at two points, when desired.

The pump 38 is connected direct with the rotor 46 of the motor 20, so that the pump will have positive direct drive from the motor and in positive timed relation with the remainder of the driven parts of the freezing mechanism.

In the event leakage should occur around the shaft 4 at its point of passage through the end of the barrel 2, a drip pan 47 is mounted above the motor 20, so that such drippings will not come in contact with the motor, the drip pan being preferably supported by standards 48, the lower ends of which are preferably attached to the motor 20. In this manner the motor is fully protected from any drippings of the brine from the barrel 2.

The operation of the device is as follows, the barrel 2 having been supplied with the requisite amount of freezing substance, such as ice and brine, through the opening 49 in the top portion of the barrel, the valves 44 and 45 are opened and the motor started for pumping the milk product into the drum 3. In the event the milk product is not frozen to the proper consistency by the time it reaches the discharge end of the drum 3, the gate 23 is to be closed against the discharge end of the tubular shaft 5 and left in such position until the milk product within the drum 3 has reached the proper frozen consistency, when the gate is again opened and the frozen product permitted to discharge, the volume of discharge being determined by the adjusted position of the gate from the end of the shaft 5.

By interspersing the flanges 11 and blades 12, the movement of the product through the drum 3 will be speedier at some points than at others, thereby thoroughly agitating and breaking up the frozen particles in such a manner that the finished product will be smooth and even and free of undue granulations.

The temperature of the interior of the barrel 2 may be readily determined by mounting any suitable form of thermometer 50 on the top end of the overflow pipe 51, so that by occasionally scrutinizing the thermometer and replenishing the barrel with ice when the temperature starts to diminish, a substantially uniform temperature may be retained. If at any time the temperature increases through neglect on the part of the attendant and the frozen product begins to run thin, the gate 23 is adjusted toward the discharge end of the shaft 5, thus slowing up the discharge of the product to such an extent that it will be fully frozen before being discharged, but as soon as the temperature has been regulated to a degree that it will freeze to the proper consistency, the gate is again moved away from the shaft to permit the machine to operate at full capacity.

At such time as it is desired to sterilize the drum and supply tank and the intermediate pipes, the drum and tank being empty, a sterilizing medium is placed in the tank 35 and directed with force through the pipes and drum to which they are attached, through the medium of the force pump 38, until said parts are thoroughly cleansed. Should the drum still contain a supply of milk product and it is desired to sterilize the tank and pipes connected therewith, the valve 45 is closed and one of the plugs 43 removed and an elbow or similar drain means substituted therefor. The tank 35 is then filled with sterilizing medium and the motor started for operating the pump 38, prior to which an air valve 52 is opened to admit air to the pipe 37. The cleansing medium will discharge through the drain means attached to the parts of the pipe 39, thus thoroughly cleansing the tank and pipes, but will be prevented from entering the drum 3 by the closing of the valve 45.

The valve 52 is also regulated during the operation of the apparatus for gradually admitting air to said pump in substantially any desired constant ratio with the rate with which the product is supplied from said tank to said drum by which the product and air are mixed, beaten and frozen into a fluffy product at the rate it is discharged from said drum.

In order to thoroughly drain the pipe 37 and tank 35, a drain cock 53 is attached to the lower end of the pipe 37, so that after the sterilizing operation has been completed, the drain cock may be opened and all the sterilizing medium, or such residue thereof as is not extracted by the pump, permitted to drain therefrom.

What I claim is:

1. A freezing mechanism having a journal frame, a rotatable drum, a hollow shaft embodied with and extending from said drum through a journal in said frame, a stationary agitator disposed axially through said drum and hollow shaft, said agitator consisting of degageable interlocking sections, one of which serves as an agitating section within said drum and the other of which serves as a holding section which extends through said hollow shaft to engagement with said frame, whereby said agitating section may be inserted into said drum and into engagement with said holding section without disturbing the holding section, said agitator including a plurality of codirectionally pitched auger sections.

2. A freezing mechanism having a freezing drum container rotatable in one direction said container having a discharge opening formed through one end wall thereof, a stationary deflector mounted within said container, said deflector comprising a hub having outwardly extending scrapers which curve in the direction opposite to the direction of rotation of said drum, at their outer ends, a set of spokes secured to said container, and rotatable therewith between said opening and said deflector in close proximity thereto, said spokes being curved oppositely to the trend of said scrapers and said spokes being angled in relation to the axial center of said container so as to auger the contents thereof through said opening by the action of said spokes in relation to said scrapers.

3. A freezing mechanism having a freezing drum container rotatable in one direction, said container having a discharge opening formed through one end wall thereof, a stationary deflector mounted within said container, said deflector comprising a hub having outwardly extending scrapers, the outer ends of which are curved in the direction opposite to the direction of rotation of said drum, said scrapers being overhung at their extremities toward said opening, and a set of spokes secured to said container, and rotatable therewith between said opening and said deflector in close proximity thereto, said spokes being curved oppositely to the trend of said scrapers and said spokes being angled in relation to the axial center of said container so as to auger the contents thereof through said opening by the action of said spokes in relation to said scrapers and the rotary path of said spokes being partly between the overhung portions of scrapers.

4. A freezing mechanism having a freezing drum container rotatable in one direction, said container having a discharge opening formed through one end wall thereof, a stationary deflector mounted within said container, said deflector comprising a hub having outwardly extending scrapers, the outer ends of which are curved in the direction opposite to the direction of rotation of said drum, a set of spokes secured to said container, and rotatable therewith between said opening and said deflector, said spokes being curved oppositely to the trend of said scrapers so as to cooperate with said scrapers to urge the contents thereof through said opening by the action of said spokes in relation to said scrapers, and a stationary auger positioned within said container on the opposite side of said deflector from said spokes, said auger being adapted to and serving to feed the contents of said container to said deflector by the rotation of said container.

JOHN H. WESTFIELD.